US006222715B1

(12) United States Patent
Gruhn

(10) Patent No.: US 6,222,715 B1
(45) Date of Patent: Apr. 24, 2001

(54) SYSTEM FOR PROTECTING ELECTRICAL DEVICES AGAINST OVERHEATING

(75) Inventor: Bernd Gruhn, Österreich (DE)

(73) Assignee: Siemens Matsushita Components GmbH & Co. KG, Munich (DE)

( * ) Notice: Subject to any disclaimer, the term of this patent is extended or adjusted under 35 U.S.C. 154(b) by 0 days.

(21) Appl. No.: 09/269,525

(22) PCT Filed: Sep. 18, 1997

(86) PCT No.: PCT/DE97/02111

§ 371 Date: Mar. 29, 1999

§ 102(e) Date: Mar. 29, 1999

(87) PCT Pub. No.: WO98/13846

PCT Pub. Date: Apr. 2, 1998

(30) Foreign Application Priority Data

Sep. 27, 1996 (DE) ............................................ 196 39 942

(51) Int. Cl.[7] ...................................................... H02H 5/04

(52) U.S. Cl. ........................ 361/103; 361/104; 338/22 R; 219/505

(58) Field of Search .................................... 361/106, 104, 361/27, 103, 105; 338/22 R, 20, 234; 219/505, 490, 265, 262

(56) References Cited

U.S. PATENT DOCUMENTS 4,431,983 * 2/1984 Rodriguez ............................ 338/220
4,728,779 3/1988 Kotani et al. .
5,153,555 * 10/1992 Enomoto et al. .................. 338/22 R
5,363,083 * 11/1994 Fischer ................................ 337/407
5,471,035 11/1995 Holmes .
5,708,553 * 1/1998 Hung .................................. 361/103
5,721,525 * 2/1998 Hofsass ............................... 337/102
5,760,676 * 6/1998 Yamada ............................. 338/22 R

FOREIGN PATENT DOCUMENTS 1906101 12/1964 (DE) .
23 42 015 3/1975 (DE) .
32 34 826 3/1984 (DE) .
42 09 542 9/1993 (DE) .
42 19 304 12/1993 (DE) .
1244474 9/1960 (FR) .
2089570 6/1982 (GB) .
07 20 1264 8/1995 (JP) .
WO 95/35577 12/1995 (WO) .

* cited by examiner

*Primary Examiner*—Michael J. Sherry
*Assistant Examiner*—Kim Huynh
(74) *Attorney, Agent, or Firm*—Schiff Hardin & Waite

(57) ABSTRACT

In order to protect electrical devices against overheating, a thermal fuse is provided which is fitted inside a housing of the electrical device to be protected. The thermal fuse, which consists of low-melting point metal, is provided directly next to a critical element of the electrical device, such as a PTC thermistor, is preferably of U-shaped or V-shaped design, and is arranged such that its vertex is directly next to the critical element.

10 Claims, 2 Drawing Sheets

Fig.1
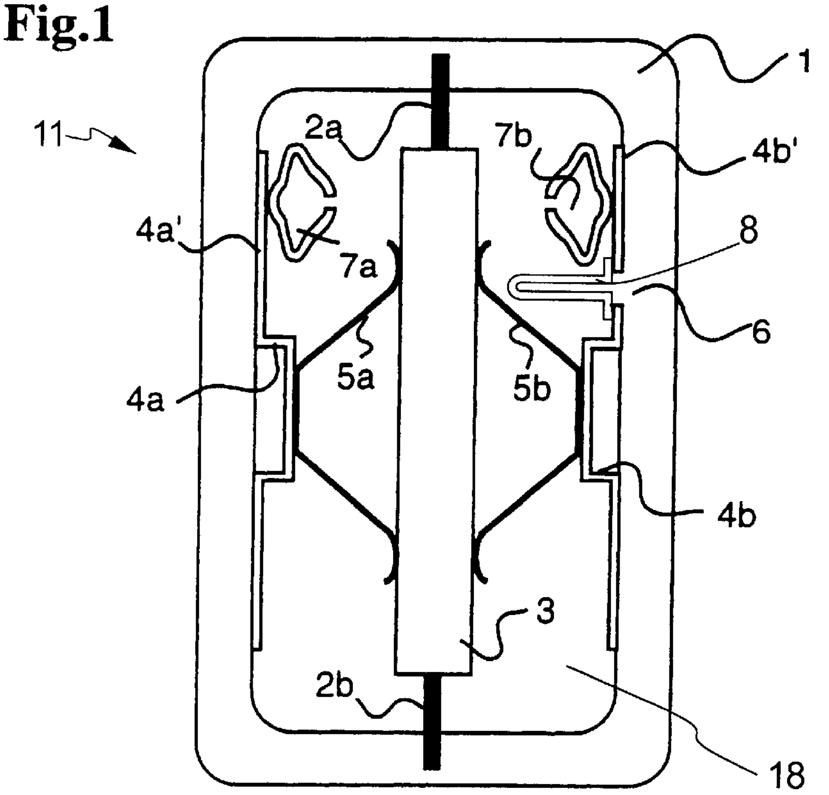
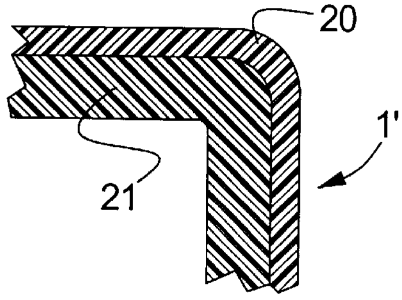
Fig. 1a
Fig.2
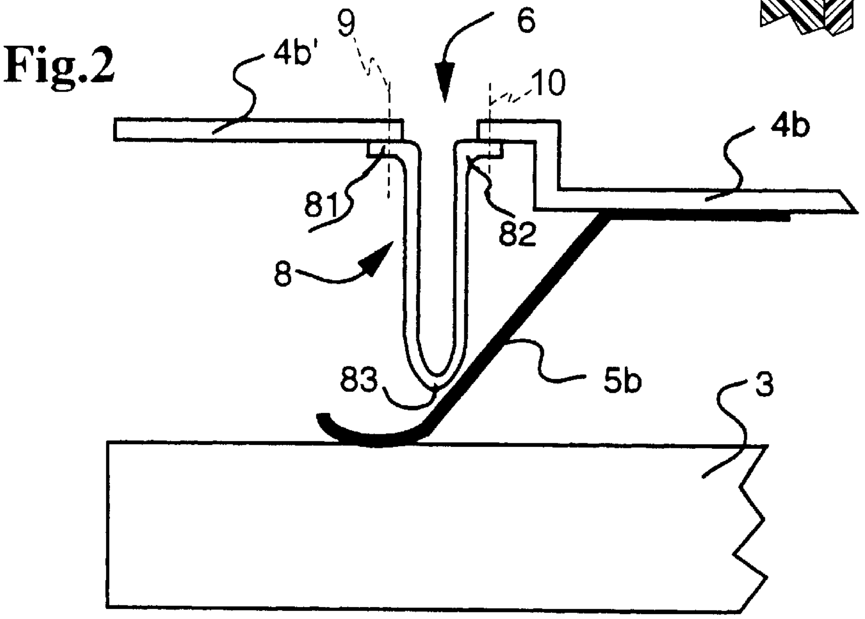

SYSTEM FOR PROTECTING ELECTRICAL DEVICES AGAINST OVERHEATING

BACKGROUND OF THE INVENTION

1. FIELD OF THE INVENTION

The present invention is directed to an electrical with a device for the protection thereof against overheating.

2. DESCRIPTION OF THE PRIOR ART

Devices for protecting electrical devices against overheating are known in the art. Such devices are disclosed by DE 23 42 015 A1.

For example, in refrigerator cooling units, a so-called motor start-up PTC thermistor can be connected in front of the units' electric motors, such that the drive shafts of the electric motors connect to the units' cooling compressors. In each start-up phase of an electric motor, the current flowing through the PTC thermistor heats it very strongly, as a result of which the resistance of the PTC thermistor increases within a very short time, frequently within seconds, from a few ohms in the cold state to very high resistances.

Since the surroundings of motor start-up thermistors contain oil residues or a generally oily atmosphere, there is a risk that these residues may under unfavorable circumstances be ignited. In the worst case, this may lead to the onset of a smouldering fire in the vicinity of the refrigerator cooling unit to which a motor start-up PTC thermistor is assigned.

SUMMARY OF THE INVENTION

An object of the present invention is to provide a device that protects electrical devices from overheating such that there is no longer even the risk of local smouldering fires being started.

One particular advantage of the present invention is that existing electrical devices need to be altered only slightly so that it is possible to fit a thermal fuse which, according to the present invention, is to be arranged directly next to a critical element. In this way, existing electrical devices can thus be retrofitted according to the present invention with a thermal fuse.

For example, in the case of a motor start-up devices having PTC thermistors, a thermal fuse is arranged directly next to the critical element, in this case directly next to the PTC thermistor. Accordingly, when there is a risk of overheating, immediate response of the thermal fuse is ensured and an electrical device equipped or retrofitted according to the present invention is protected from overheating with absolute reliability.

When the thermal fuse, arranged according the present invention, melts, the electrical supply to the electrical device to be protected is immediately interrupted which reliably avoids the risk of a possible smouldering fire.

Since the thermal fuse is fashioned U-shaped or V-shaped, when a thermal fuse is arranged and fitted according to the present invention inside the housing of an electrical device, for example a motor start-up device having a PTC thermistor, the vertex of the U-shaped or V-shaped fuse is positioned directly next to the critical element, i.e, the PTC thermistor.

When the thermal fuse which is advantageously designed according to the invention, is used and arranged directly next to the element to be made safe, for example a PTC thermistor, then the thermal fuse will melt particularly quickly because of the small distance between the thermal fuse and the critical element to be protected from overheating.

In an embodiment of the present invention, in order to prevent spreading of an incipient smouldering fire, as an additional safety-related provision, the housing enclosing the electrical device consists of self-extinguishing plastic and/or the housing is clad with self-extinguishing plastic.

After (albeit perhaps a short time later) the thermal fuse has melted and the electrical supply has been interrupted, it is no longer possible for the heat source (in the example currently referred to, the PTC resistor of the motor start-up device) to heat up. Further, the incipient smouldering fire is immediately extinguished because the housing enclosing the electrical device, or the entire housing, is clad with self-extinguishing plastic. Spreading of a smouldering fire is thereby prevented with absolute reliability.

DESCRIPTION OF THE DRAWINGS

FIG. 1 is a plan view of a motor start-up device having PTC thermistor. FIG. 1*a* is a partial cross sectional view of a modified housing having a cladding of self-extinguishing plastic.

FIG. 2 is a side view of the motor start-up device of FIG. 1 with a thermal fuse in position;

DESCRIPTION OF THE PREFERRED EMBODIMENTS

Figure 3:
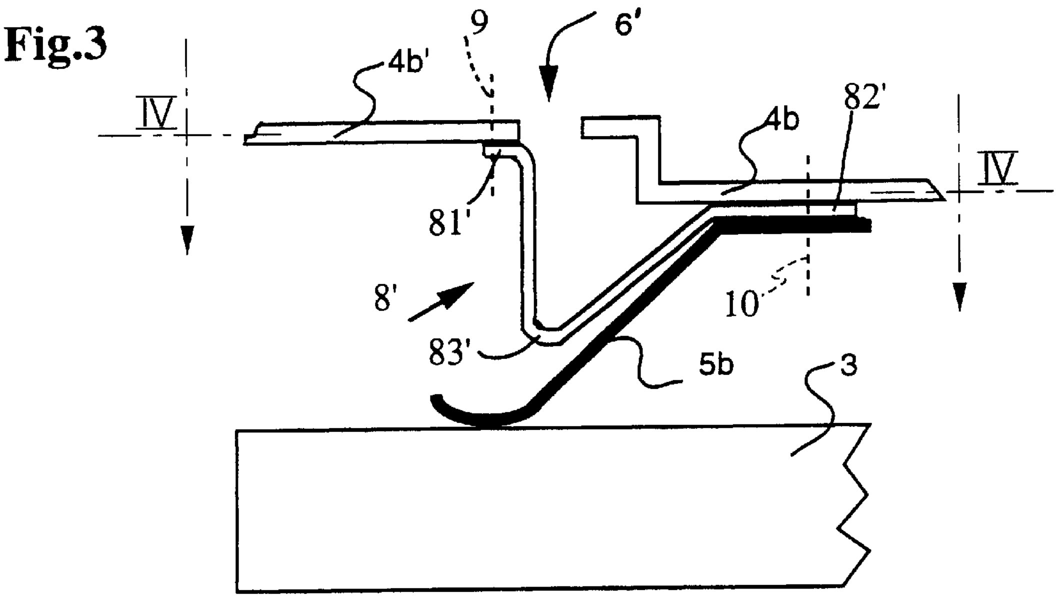
FIG. 3 is a side view of the motor start-up device of FIG. 1 with a thermal fuse in position.

In the plan view of a motor start-up device 11 which is represented in FIG. 1, a PTC thermistor 3 is held in a housing 1 via supports 2*a* and 2*b*. Spring contacts 5*a* and 5*b*, via which current is fed, bear on the PTC thermistor 3 at opposite sides thereof.

The spring contacts 5*a* and 5*b* are conductively connected to connection parts 4*a* and 4*b*, which are connected via extensions 4*a*' and 4*b*' to electrical plug-in contacts 7*a* and 7*b*. The extension 4*b*' is split from the connection part 4*b* by a discontinuity 6, thereby interrupting current flow to connection part 4*b*.

As represented as an enlarged detail in FIG. 2, the discontinuity 6 is bridged by a thermal fuse 8 by fastening two ends 81 and 82 of the thermal fuse 8, which are angled by about 90°, to the extension 4*b*' and the connection part 4*b*, which are separated from one another by the discontinuity 6, using for example rivets 9 and 10.

In a preferred embodiment, the thermal fuse 8 in FIG. 2 has the shape of a U, and its vertex 83 which points downwards in FIG. 2 extends as close as possible to the PTC thermistor 3.

The thermal fuse 8 is made of a low-melting point material whose melting point is chosen such that it is below a critical temperature of the PTC thermistor 3. This ensures that the maximum permissible temperature for the PTC thermistor 3 or for the motor start-up device 11 in which the PTC thermistor 3 is fitted, is not exceeded.

FIG. 3 depicts a plan view which corresponds to FIG. 2 and is also rated by 90° relative to the plan view in FIG. 1. In contrast, FIG. 4 depicts a plan view of a 6-branched spring contact 5*b* along a line IV—IV in FIG. 3, in the direction of the connection part 4*b* and its extension 4*b*'.

As can be seen from the plan view in FIG. 3, according to the invention a modified continuation of the thermal fuse 8' is of approximately V-shaped design, the vertex or turning point 83' of the V-shaped thermal fuse 8' being again arranged directly next to the PTC thermistor 3.

Figure 4:
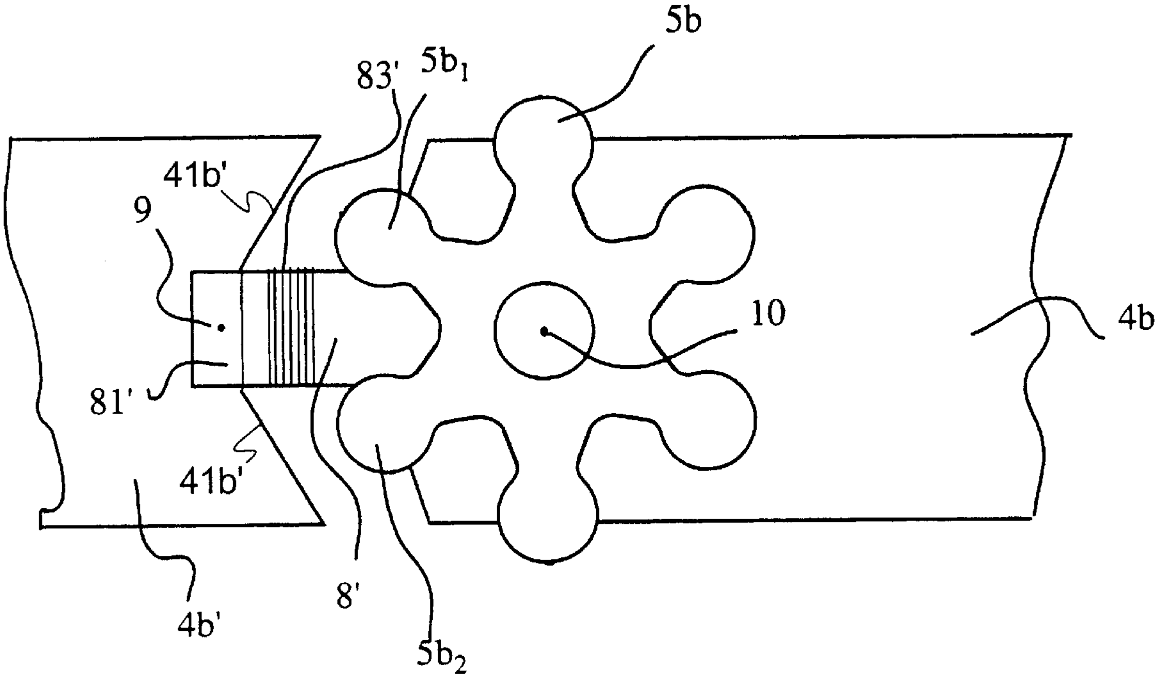
FIG. 4 is a plan view of thermal fuse illustrated in FIG. 3.

In an embodiment of the device according to the invention which is represented in FIG. 4, the extension 4*b*' has a circular or V-shaped indentation 41*b*' at its end of the discontinuity 6 adjoining the plug-in contact 7*b*. The opposite edge region of the discontinuity 6 is preferably designed with a shape complementary to the indentation 41*b*'.

As can be seen in FIGS. 3 and 4, modified extension of a thermal fuse 8' is fastened by its left angled continuation 81' to the extension 4*b*' and by its other end 82' between the spring contact 5*b* and the connection part 4*b*, using a rivet 10 which is represented by a dashed line in FIG. 3 and by a dot in FIG. 4.

Referring to the vertex or turning point 83' of the V-shaped thermal fuse 8' may also be arranged between two branches $5b_1$, and $5b_2$ of the 6-branched spring contact 5*b*. In this way, the distance between the PTC thermistor 3, which is to be protected against overheating, and the thermal fuse 8' can be kept particularly small.

This small distance between the thermal fuse 8', or its vertex 83', and the PTC thermistor 3 ensures immediate response, that is to say melting of the thermal fuse 8', as soon as a temperature is reached which could become critical either for the PTC thermistor 3 itself or for the device 11 whose housing 1 accommodates it.

It is particularly advantageous in the case of the embodiments represented in FIGS. 3 and 4 that one end of the thermal fuse 8', namely the angled continuation 82', is held and secured using the same rivet 10 between the connection part 4*b* and the spring contact 5*b*. In contrast to the embodiment depicted in FIG. 2, only one additional rivet point for the rivet 10 is needed in the case of the embodiment of the thermal fuse 8' in FIG. 4.

This is particularly advantageous if, for example, a motor start-up device having a PTC thermistor 3 is equipped from the start with thermal fuse 8' provided according to the invention.

Although the way of fitting and fastening the V-shaped thermal fuse 8' which is depicted in FIGS. 3 and 4 is also possible in the case of retrofitting, the embodiment and fitting method represented in FIG. 2 for the thermal fuse 8 are generally preferable in the case of retrofitting, even though two holes need to be provided in this embodiment for inserting the rivets 9 and 10.

In the case of retrofitting with the thermal fuse 8' according to FIGS. 3 and 4, however, it would be necessary to drill out a rivet used to fasten the 6-branched spring contact 5*b* to the connection part 4*b*. After the continuation 82' of the thermal fuse 8' has been introduced between the connection part 4*b* and the spring contact 5*b*, a new rivet 10 is used to connect the connection part 4*b*, the continuation 82' of the thermal fuse 8' and the spring contact 5*b* firmly to one another. The housing 1 may be made of a self-extinguishing plastic or be a housing 1', as shown in FIG. 1*a*, which has a cladding layer 20 of self-extinguishing plastic on a housing wall 21. The wall 21 can also be made of a self-extinguishing plastic material.

Although modifications and changes may be suggested by those skilled in the art, it is the intention of the inventors to embody within the patent warranted hereon all changes and modifications as reasonably and properly come within the scope of their contribution to the art.

What is claimed is:

1. An electrical device with a device for the protection thereof against overheating, said electrical device comprising: a thermal fuse made inside a housing of said electrical device to be protected against overheating, said thermal fuse being located next to a critical element of said electrical device, said thermal fuse consisting of low-melting point metal and having a U-shaped design having a vertex and being positioned such that said vertex is next to said critical element, a plug-in contact, an extension electrically connected to said plug-in contact, said extension having a discontinuity proximate to said plug-in contact, and said U-shaped thermal fuse having angled ends, said angled ends being fastened on opposite edges of said discontinuity.

2. An electrical device according to claim 1, wherein said critical element is a PTC thermistor.

3. An electrical device according to claim 1, wherein said housing is clad with self-extinguishing plastic.

4. An electrical device according to claim 1, wherein said housing consists of self-extinguishing plastic and is clad with self-extinguishing plastic.

5. An electrical device according to claim 1, wherein said housing consists of a self-extinguishing plastic.

6. An electrical device with a device for the protection thereof against overheating, said electrical device comprising: a thermal fuse inside a housing of said electrical device to be protected against overheating, said thermal fuse being located next to a critical element of said electrical device, said thermal fuse consisting of low-melting point metal and having a V-shaped design having a vertex and being positioned with said vertex being next to said critical element, a plug-in contact, a spring contact bearing on said critical element, an extension electrically connected to said plug-in contact, said extension having a discontinuity proximate to said plug-in contact, and said V-shaped thermal fuse having first and second angled continuations, said first angled continuation being coupled to an end of said extension adjoining said plug-in contact, said second angled continuation of said thermal fuse being fastened between said connection part and said spring contact.

7. An electrical device according to claim 6, wherein said critical element is a PTC thermistor.

8. An electrical device according to claim 6, wherein said housing consists of self-extinguishing plastic.

9. An electrical device according to claim 6, wherein said housing is clad with self-extinguishing plastic.

10. An electrical device according to claim 6, wherein said housing consists of self-extinguishing plastic and is clad with self-extinguishing plastic.

* * * * *